Oct. 12, 1965   J. R. SUCHER   3,211,817
METHOD OF ORNAMENTING DISK-LIKE OBJECTS AND RESULTING PRODUCT
Filed April 17, 1962   2 Sheets-Sheet 1
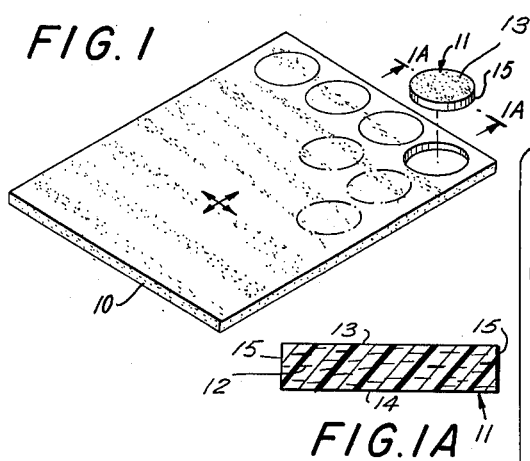
FIG. 1
FIG. 1A
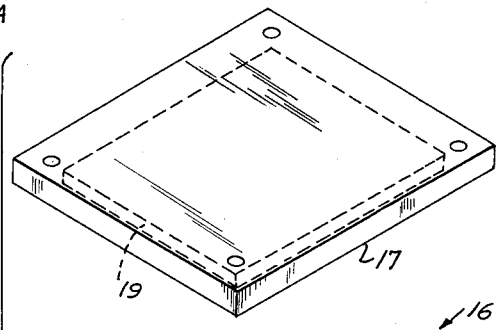
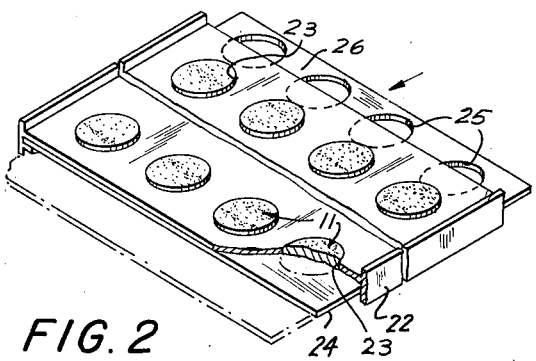
FIG. 2
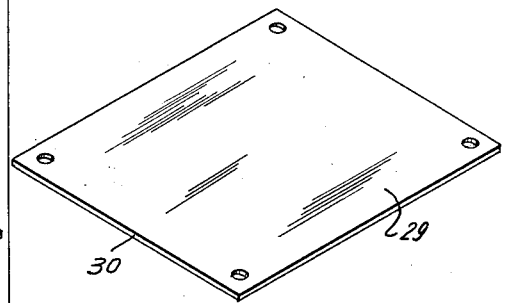
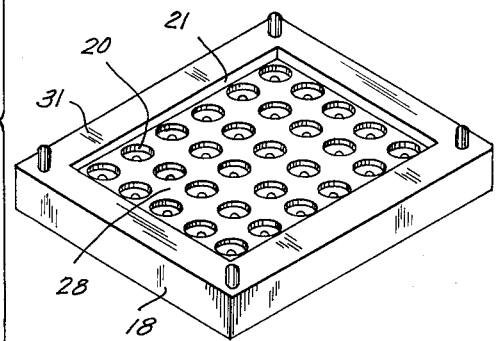
FIG. 3
INVENTOR.
JOSEPH R. SUCHER
BY Mark Basseches
ATTORNEY Oct. 12, 1965  J. R. SUCHER  3,211,817
METHOD OF ORNAMENTING DISK-LIKE OBJECTS AND RESULTING PRODUCT
Filed April 17, 1962  2 Sheets-Sheet 2

INVENTOR.
JOSEPH R. SUCHER
BY Mark Basseches
ATTORNEY

United States Patent Office 3,211,817
Patented Oct. 12, 1965

3,211,817
METHOD OF ORNAMENTING DISK-LIKE OBJECTS
AND RESULTING PRODUCT
Joseph R. Sucher, Woodmere, N.Y., assignor to Emsig Manufacturing Co., New York, N.Y., a partnership
Filed Apr. 17, 1962, Ser. No. 188,153
3 Claims. (Cl. 264—108)

This invention relates to a method of making ornamental disk-like objects, and more particularly, buttons and the resulting product.

This invention is an improvement of my invention entitled Compression Molding Plastics, U.S. Patent No. 2,652,597, dated Sept. 22, 1953.

My invention is concerned specifically with the embodiment of an integral pearlized sheen in plastic, and more specifically, in plastics such as those utilizing polyester resinous reaction products, of which the patent to Dangelmajer, U.S. No. 2,643,983, is an example.

In the patent granted to me, there is disclosed the successful adaptation of liquid, thermo-setting polyester resins to compression molding whereby high quality, thermo-setting resinous compositions may be converted to particular disk-like forms, such as button blanks, whereby, when combined with pearl essence, button blanks having integral pearly sheen are obtained. In this procedure it is desirable to secure a high degree of orientation of the lamellae so that the face of the disk-like member or button has imparted to it the maximum degree of lamellae orientation with minimum turbulence, which turbulence is overcome to a large degree by prepolymerization of the charge, as more particularly taught by the aforesaid patent to Dangelmajer. Frequently, the peripheral edges and other portions of the disk-like object of button do not evidence the same degree of integral sheen as the face portion of the disk.

Known to me is the procedure as described in the aforesaid Dangelmajer patent, of casting the liquid resinous batch and pearly essence between plates, such as glass plates separated by a gasket, to form sheets, from which disk-like objects are punched while soft, or drilled when hard, wherein during the process of casting between glass plates or the like, an integral pearly sheen is effected in the orienting influence of pouring between the plates. Similar results have been procured in making sheets by casting resin centrifugally with nacreous fillers having lamellae form, such as disclosed with other and equivalent resins in the patent to Clewell No. 2,265,226, specific details of which procedure are enumerated in a companion application Serial No. 141,146, filed Sept. 27, 1961, now Patent No. 3,164,647 of Jan. 5, 1965, in the name of Daniel A. Fischler and assigned to the assignee of this invention. Sheets made by these methods or by extrusion between plates involve stamping or punching or drilling the disk-like objects, from which buttons are later finished by the usual facing or drilling and shaping.

In these latter procedures, not only is there the greater expense in finishing operations, but the peripheral edges of the punched, drilled, bored-out or sawed objects in the form of disks, lack the high polish and pearly sheen of the face and back surface because of the predominant facewise orientation of the lamellae of pearly essence in parallelism with the face-forming and/or back of the sheet.

Thus, the compression molding method of making disk-like objects, such as buttons, and the casting of such similar resinous batches have their disadvantages insofar as finish and surface appearance are concerned, especially in the working of plastic compositions of relatively transparent character, such as the polyester resins mentioned in the patents aforesaid in respect of securing the maximum, uniformly distributed, pearlized integral sheen.

Accordingly, it is an object of this invention to provide molded plastic disks, more specifically, buttons, having novel contours made possible by compression molding procedure, and having high integral pearlized sheen on the faces as well as the peripheral edges of the disk-like objects with substantial uniformity, and more specifically, in which the lamellae at the peripheral edge surfaces are aligned parallel with such surfaces and lamellae at the face and rear surfaces are preponderantly oriented in parallelism to the plane of such face and rear surfaces.

Still more particularly, it is an object of this invention to incorporate in a compression molding procedure for working liquid resins, particularly polyester resins, the ornamental alterations possible in simulating pearlized effects involved in casting sheets in the form of plates whereby the combined benefits of each system of disk formation is possible and overcoming the shortcomings of each of the methods, thus to create a button or like object having optimum sheen on all exposed surfaces.

Specifically, it is an object of the invention to provide disk-like objects, more specifically buttons, with a pearlized finish, in which the face portion of these articles utilizes a segment, punched, bored or drilled from sheets previously made by any of a number of methods for supplying sheets of synthetic resins with pearlized finishes, and apply the same to a base autogenously fused thereto, formed by compression molding, whereby there is a more complete orientation of the pearl essence or similar lamellae at the peripheral edges and other portions of the disk or button, and molded shapes may be imparted to the major portion of the disk or button.

Still more particularly, it is an object of the invention to provide novel effects in disk-like objects, such as buttons, whereby overall pearly effects are improved and the labor of machining, facing, polishing, ornamenting, is minimized.

Still more particularly, it is an object of the invention to provide disk-like objects or buttons in which valuable multi-colored and aesthetic effects are achieved while retaining a generally uniform and highly effective integral pearlized sheen.

Still a further object of the invention lies in the provision of a novel method for producing articles of the type described.

Other objects of the invention reside in the production of a compression molded button in which economies are effected in the quantity of liquid resin employed and in securing a high quality of molding, achieving novel effects and improved overall lamellae orientation so desirable in securing a high quality of integral pearlized effect.

To attain these objects and such further objects as may appear herein or be hereinafter pointed out, reference is made to the accompanying drawings, forming a part hereof, in which:

FIGURE 1 is a perspective view showing one stage of making an intermediate product;

FIGURE 1a is a magnified section on the line 1a—1a of FIGURE 1;

FIGURE 2 is a perspective view to illustrate another stage in the handling of the intermediate product;

FIGURE 3 is a diagrammatic exploded perspective view of the compression molding components in another stage of the process;

Figure 4:
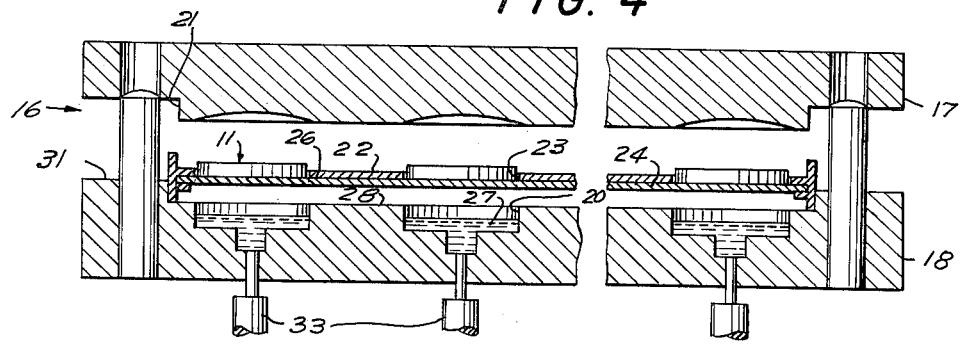
FIGURE 4 is a magnified fragmentary section of still another stage of the compression molding components in the partially open position.
Figure 5:
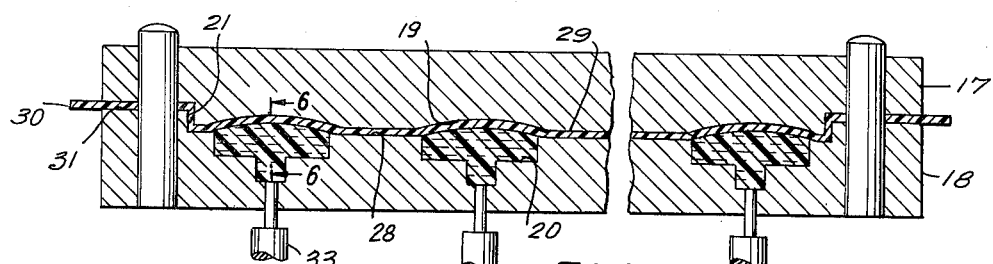
FIGURE 5 is a view of the compression mold fully charged.

Referring now to the appended drawings, the procedure entails two phases. The first phase constitutes the preparation of a facing blank or pellet. In accordance with the invention, the sheet 10 is first prepared, employing any of the numerous known methods for making such sheets and preferably from compositions comprising copolymerized, unsaturated alkyd resin and a material having a $CH_2=C<$ group, such as styrene, such as disclosed in the patent to Dangelmajer No. 2,643,983, June 30, 1953, reference being made to Example I wherein there is described a method for making a sheet having integral pearly sheen by casting an unsaturated thermosetting liquid polyester composition obtained by homogeneously mixing styrene and polyester resin formed by the condensation of propylene glycol with fumeric acid and phthalic acid anhydride in the presence of .05% methyl ethyl ketone peroxide, .05% benzol peroxide and 3% of commercial pearl essence. Generally, a composition consisting of thermosetting styrene modified unsaturated liquid polyester resin component, copolymerized with a compound having $CH_2=C<$ group together with suitable polymerization, catalysts as described, and light reflecting lamellae are employed, the details of which are referred to in said Dangelmajer patent, and more specifically in a companion application in the name of Fischler, Serial No. 141,146, filed Sept. 27, 1961, now Patent No. 3,164,647, owned by the same assignee, wherein there is described and disclosed and exemplified a suitable general purpose styrene-modified polyester, such as Selectron, made by Pittsburgh Plate Glass Co., wherein this material, at a viscosity of 1000 centipoises, has added to 100 parts thereof, 2 parts of a nacreous pearl essence pigment as the pearlizing component, it being understood that lamellae lead carbonate of crystalline form may be employed. This composition, together with 2 parts of 60% methyl ethyl ketone peroxide, commercially known as DDM, and .03% of 6% cobalt naphthanate, is employed to form the polymerized sheet 10 for the most effective orientation of the lamellae in the sheet 10 to secure a pearlized sheet as described.

This sheet may be made with the procedure outlined in the Fischler application, following any one of the known procedures, such as by cell casting, extrusion, film forming, with which this present application does not concern itself. However, it may be stated that in the formation of a pearlized sheet with integral sheen, as distinguished from compression molding of a similar composition into an already contoured article under the patent to Sucher No. 2,652,597, the orientation of the pearlized nacreous filler of lamellae outline is normally predominantly limited to a single plane.

Pellets or disks 11, stamped, sawed, bored, punched or cut from the sheet, will exhibit maximum pearly effect where the lamellae 12 are oriented with their broad dimension generally in parallelism with the front face 13 and the rear face 14. The edges or periphery 15 of the disk are thereby left raw, with a dull pearlized effect by reason of the tendency of the lamellae to be arranged edgewise as viewed from the periphery.

While the disks 11 may be formed directly into buttons by polishing, facing and drilling operations, the edges of such buttons will lack the pearly brilliance and sheen which is present at the faces of the buttons.

Another shortcoming of direct use of the disks 11 in making buttons of different face formation or back formation, such as shank buttons, is the need for contouring such disks.

Such contouring requires the machining away of the outer layer of the disk wherein the pearl is usually most perfectly oriented and the consequent exposure of lesser oriented portions of the button.

As examples of contoured buttons there may be mentioned the so-called shank buttons, and sew-through buttons having a depression or a dished portion for cradling the sewing thread. Due to the difficulties of forming contoured buttons from disks, such buttons, particularly of the pearly variety, have heretofore been manufactured by compression molding in accordance with the practice and using the material enumerated in the patent to Sucher, No. 2,652,597.

The adaptation in the Sucher patent of liquid polyester resins therein described for compression molding brought with it certain economic losses in the use of a quantity of the resinous material in excess of the capacity of the mold cavity, to assure sealing an excessive charge in the compression molding cavity prior to closing of the mold by extruding the charge over the adjacent lands of the cavity.

Likewise, as previously described, orientation of the pearlizing lamellae tends to be affected by the contour of the cavities, to alter or even disturb the orientation which is desirable not only at the face of the button charge but at the peripheral edges.

It has been discovered that the highly desirable objective of maximum arrangement of the surface ornamentation, specifically of the orientation of the lamellae along the front face of the button blanks as well as the periphery and rear face, may be accomplished by a combination of phases of liquid compression molding, particularly in accordance with my invention as set forth in said Patent No. 2,652,597. Thus, in accordance with the present method there may be combined the advantages of reduced machining which compression molding permits, with the advantageous known procedures for making buttons from sheets and disks, such as shown in FIGURES 1 and 1a.

Specifically, after providing a supply of disks in accordance with FIGURE 1a, I utilize the same as facings for a liquid charge in a compression mold having the features set forth in my patent, more particularly having provisions for heating in the temperature range of 250 to 500° F. and pressures of at least 3,000 pounds per square inch.

A multi-cavity mold 16, diagrammatically illustrated in FIGURE 3, constitutes the top mold 17, and the bottom mold 18. The top and bottom molds are furnished with contouring cavities 19 and 20, respectively, intended to provide aligning contouring for a shank button, it being preferred that the main body of the cavity for formation of the button lies in the bottom mold. As my prior patent, it is preferred that the upper mold section and the bottom mold section be provided with registering retaining peripheral walls 21 so that intimate contact may be made when the compression mold parts are brought into engagement with each other.

With a compression mold as described, the procedure of the second phase is as follows:

The disks 11, previously made, are filled upon a loading board 22 consisting of seats 23. The location of the seats 23 on the loading board 22 corresponds exactly to the location of the cavities 20 of the lower section of the compression mold. A slide 24, furnished with similarly located cut outs 25, is provided, lands 26 forming bottoms for the seats 23 temporarily to hold a charge of disks 11 placed in the seats 23, in the manner well known in using multi-cavity compression molds wherein pellets of material, at their thermoplastic stage, are charged into such mold cavities.

With this preliminary preparation, the bottom mold section is supplied with a charge of liquid compression molding composition 27, exemplified in the patent to Dangelmajer previously mentioned, which has the nacreous filler therein. This is accomplished by pouring a metered quantity of the liquid polyester resin over the bottom mold and spreading the same with a suitable roller spreader into the mold cavities 20, partially to fill the same, such rolling also clearing the viscous resinous material from the lands 28. In this condition of charge of the bottom mold section, there is interposed between the top mold and the bottom mold the loading board 22 carrying the disks 11, previously made under phase 1 of the process described. The disks 11 are then discharged into the cavities 20 to overlie the viscous charge 27, and the empty loading board is removed. Thereafter a member 29, in the form of cellophane, coated paper, cellulose acetate, casein film, referred to in my prior patent aforementioned, is interposed between the top and bottom sections of the mold to overlie and contact the charge in the bottom mold, covering the lands 28 and the disks 11 which have been deposited into the mold cavities 20. The peripheral edges 30 of the membrane 29 are extended to be pinched by the retaining walls 21 and preferably at the lands 31, and to carry out the features of my patent aforesaid, a stripper plate under spring bias may also be employed for the top mold.

An alternative method for charging the mold cavities includes metering the viscous liquid polyester charge on the membrane 29, covering the mold cavities 20 to deposit the charge into the mold cavities, closing the mold to effect a distribution of the liquid charge into the mold cavities, reopening the mold sections to separate the membrane from the lower mold section, loading the disks 11 in overlying position of the mold cavities, as heretofore described, superimposing the membrane on the disk-filled cavities, and then closing the mold and proceeding in the manner in accordance with the prior embodiment, to procure the full cure of the liquid polyester charge.

It should be noted here that care should be exercised in correlating the outer diameter of the disks 11 to the cavities 20, to supply a clearance of close tolerance, and for a button size of from 13 to 35 ligne, I have utilized clearances of from .006 to .0125″. This serves to provide a gap 32 between the pellet 11 and the mold cavity peripheral walls through which excess liquid polyester resin may emerge into the parting line of the mold adjacent the lands 28. The observation of this condition does not interfere with the contacting of the membrane over the entire surface of the cavities 20, including the disks 11, to carry out the features of my prior invention as to exclusion of air between the surface of the charge and said membrane prior to the closing of the mold. The charge of resin 27 and the disks 11 are then subjected to compression and heat for curing the same to the final, thermoset condition.

Figure 7:
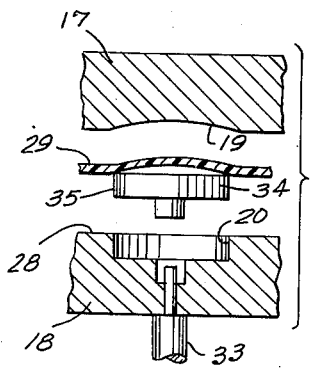
FIGURE 7 is a fragmentary section of the mold cavity components and the charge in the open position after completion of the molding operation.
Figure 8:
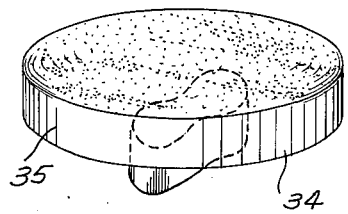
FIGURE 8 is a magnified perspective view illustrative of a shank button blank made in accordance with the mold operation herein described.
Figure 6:
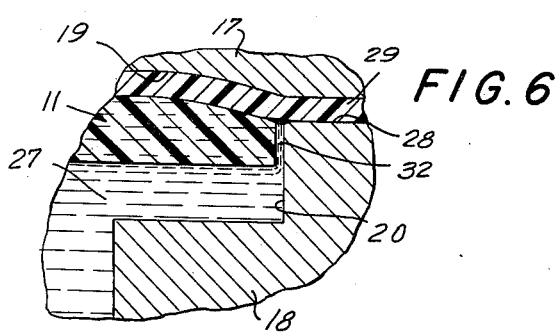
FIGURE 6 is a magnified fragmentary section taken on the line 6—6 of FIGURE 5.

Upon effecting the prescribed time-temperature-pressure cycle for curing the charge 27, the mold sections are opened, as shown in FIGURE 7, and the buttons 34 are carried by the membrane 29 for removal from the mold sections. If desired, knock-out pins 33 may be used to aid in the removal of the buttons from the cavities.

The mode of operation as described serves to minimize the quantity of material exuded through the clearance 32 between the periphery of the disk 11 and the inner wall of the cavity 20, with very little flash or loss of material at the parting line, and without loss of the hydrostatic back pressure membrane sealing, desirable in compression molding liquid polyester resinous batches. Additionally, the minimum clearance between the disk 11, periphery and side walls of the mold cavity provide the clearance slot 32, which effectively serves to orient the lamellae so that their longest axes are arranged in parallelism with the wall 20 constituting the periphery 35 of the button. The heat and pressure utilized for curing the charge 27 serves autogenously to fuse the disk 11 with said charge 27, whether or not the disks 11 have been previously fully cured to the infusible state.

Where partially cured material is employed for the sheets 10, from which disks 11 are punched or otherwise formed, the heat and pressure of compression molding the composite will serve to cure the disks 11 to their final cured condition.

The advantages incident to the combined process recited lie in the production of novel effects in that the disks 11 may first be formed and ornamented en masse, particularly in providing an integral pearlized sheen most effectively arranged in the plane of the sheet along its longest surface with variegated effects, and then combined with the compression molding charge where contouring is effected by molding, as in the provision of an integral protruding shank portion. Multi-colored tones may be produced by pigmenting or dyeing the sheets from which the disks 11 are made, with a contrasting pigment or dye in the charge 27 in predetermined design, whether or not filled with a nacreous filler. Such non-pearlized sheets may likewise be employed as the sheets from which the disks are formed.

More important advantages are incident to the effectiveness of the compression molding of the liquid resinous charge having the pearlized filler in that orientation of the peripheral edges of the disk-like button to be cast is secured by reason of the effective hydrostatic pressure engendered at the peripheral edges as the excess charge, at maximum viscosity, seeps into the flash forming portion at the parting line of the mold sections against the back pressure of the sealing film.

By the expedient of thus compression molding the main body of the button and uniting the facing disk thereto, a wide range of viscosities of the liquid unsaturated polyester resin may be employed, and prepolymerization to the range of maximum viscosity before gelation, as preferred by me when no overlying disk is employed, need not be followed to the same extent.

Thus, while I prefer in making a unitary compression molding charge with liquid polyester to employ a viscosity within the limits of 30,000 to 80,000 centipoises, I may employ a resin prepolymerized in a wide range of from 8000 centipoises to the maximum viscosity before gelation. It will be understood that the greater the clearance between the periphery of the facing disk and the cavity in which the liquid polyester resin is distributed, the higher should be the prepolymerization factor employed for the charge, and, conversely, the closer the clearances, the lower the prepolymerization factor.

By the combined procedure of compression molding the liquid polyester resin with the mono-planar oriented disk in situ, peripheral edge polishing and finishing, heretofore practiced in connection with blanks made from the sheet casting method, are eliminated or greatly reduced since the compression molding provides a finished, highly polished peripheral edge which may be already formed to a desired contour and, as previously stated, the pearlizing lamellae are preponderantly oriented so that the long plane of the lamellae are in parallelism with the plane of peripheral edge.

It will be understood that while I have exemplified button blanks for combined compression molding with liquid polyester resin, a wide variety of plastic disks may be made where it is desired to provide a high order of pearlized integral sheen on the facing as well as the peripheral edges of the article, and thus tiles, plates, trays, dishes are contemplated within the scope of my invention for the provision of a novel button or like plastic disk.

Likewise, the disks need not be made of pearlized sheets, but I may use disks made from mono-planar ornamented sheets, such as by engraving, extruding, streaking, printing, transfer printing, blending of streaks of pigment, on sheets which are compatible and will autogenously fuse with the compression molding charge in the mold cavities and which carry the pearlized, heat-curable, liquid thermo-setting resinous charge.

Having thus described the invention and illustrated its use, what is claimed as new and is desired to be secured by Letters Patent is:

1. The process of producing a button comprising, placing in a mold cavity a charge of liquid thermosetting polyester resin filled with nacreous lamellae, placing a preformed disk within the mold cavity over the charge, the circumference of the disk being slightly less than the circumference of the mold cavity, thereby providing a narrow annular space between the disk and the mold, applying heat and pressure to the charge and the disk to force some of the charge upwardly into the annular space between the periphery of the disk and the mold and to set the charge, whereby the peripheral edge surface of the product is pearlescent.

2. The method of producing an article such as a button by compression molding, which comprises the steps of placing a charge of liquid thermosetting polyester resin having a filling of laminar conformation in a mold cavity, placing a preformed member having a peripheral edge portion slightly smaller than the inner surface of said cavity within said mold cavity so that a narrow space is defined between said inner surface and said edge portion, said resin being interposed between said member and the bottom of said cavity, and applying heat and pressure to the charge and the member to force some of the charge outwardly into the space between said inner surface and said edge portion, and to set the charge, whereby the broad dimension of the laminar filler in that portion of the charge which lies between said inner surface and said edge portion is aligned substantially in parallelism with said edge portion.

3. The method of producing an article such as a button by compression molding, which comprises the steps of placing a charge of liquid thermosetting polyester resin filled with nacreous lamellae in a mold cavity, placing a preformed member having a peripheral edge portion slightly smaller than the inner surface of said cavity within said mold cavity so that a narrow space is defined between said inner surface and said edge portion, and said resin is interposed between said member and the bottom of said cavity, and applying heat and pressure to the charge and member to force some of the charge outwardly into the space between said inner surface and said edge portion to set the charge, whereby the peripheral edge surface of the product is pearlescent.

References Cited by the Examiner

UNITED STATES PATENTS

| | | | |
|---|---|---|---|
| 2,431,393 | 11/47 | Franklin | 18—59 |
| 2,652,597 | 9/53 | Sucher | 264—108 |
| 2,859,530 | 11/58 | Renaud | 264—261 |
| 3,001,255 | 9/61 | Schafer | 24—90 |
| 3,028,646 | 4/62 | Janes | 24—90 |
| 3,064,314 | 11/62 | Gagne et al. | 18—59 |

ROBERT F. WHITE, *Primary Examiner.*

WILLIAM STEPHENSON, *Examiner.*